Sept. 3, 1946.    E. A. STALKER    2,406,919
CONTROL OF AIRCRAFT
Filed Aug. 22, 1940    2 Sheets-Sheet 2

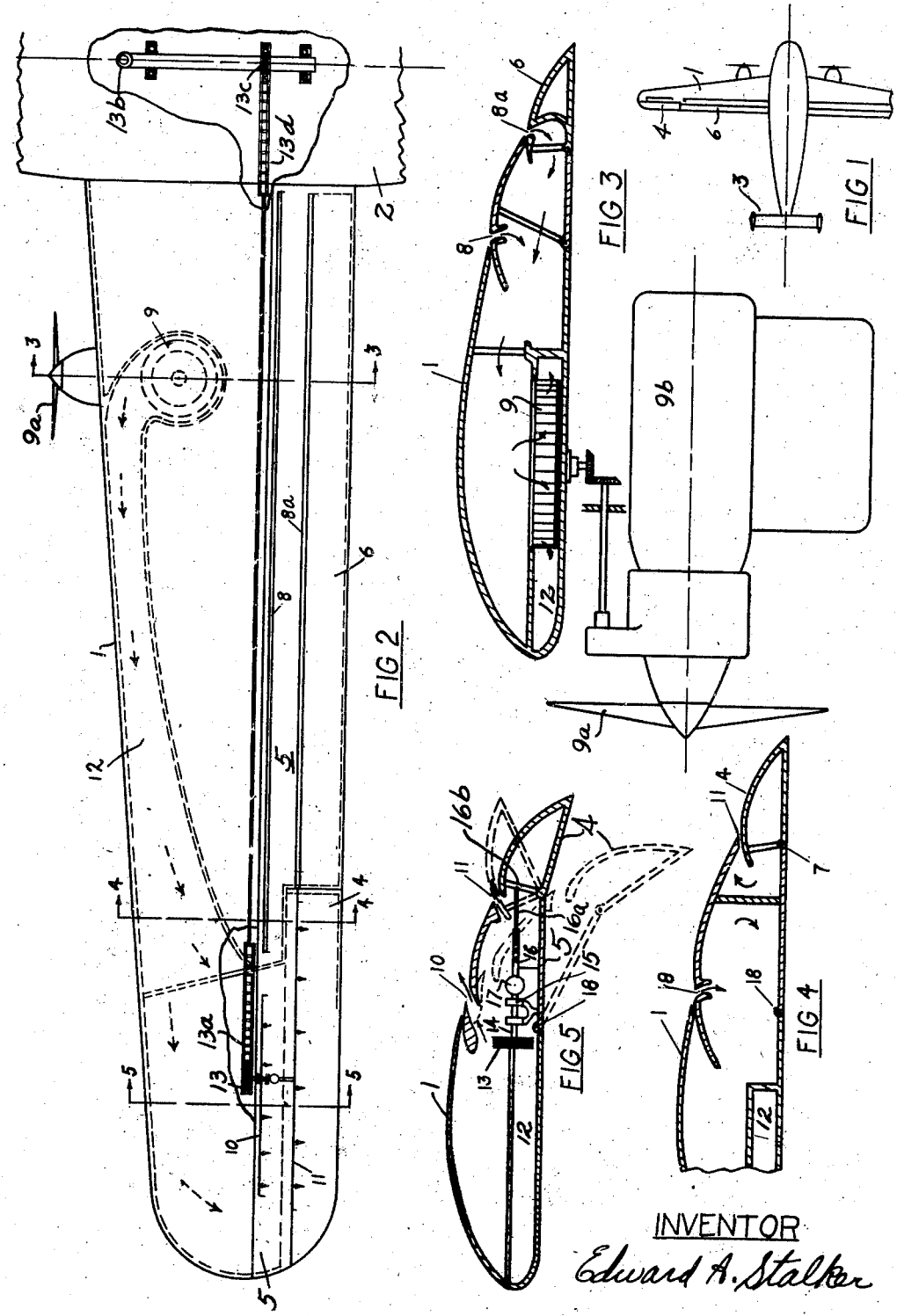

INVENTOR
Edward A. Stalker

Patented Sept. 3, 1946

2,406,919

UNITED STATES PATENT OFFICE 2,406,919

CONTROL OF AIRCRAFT

Edward A. Stalker, Ann Arbor, Mich.

Application August 22, 1940, Serial No. 353,712

10 Claims. (Cl. 244—90)

My invention relates to aircraft and particularly to the aerodynamic control. It has for its objects, first to provide a means capable of producing powerful rolling moments, second to provide a means of producing a powerful yawing moment, third to provide a lateral control means in which the adverse yawing moment is reduced or converted to a favorable moment, fourth to provide a simple and effective means of controlling a flow through a slot, fifth to provide a properly proportioned aileron for action with a slot flow, sixth to provide a wing with a jet discharge for boundary layer control. Other objects will appear from the appended specification and drawings.

I accomplish the above objects by the means illustrated in the accompanying drawings in which—

Figure 1 is a plan view of the aircraft;

Figure 2 is a fragmentary plan view of a wing;

Figure 3 is a section along the line 3—3 in Figure 2;

Figure 4 is a section along line 4—4 in Figure 2; and

Figure 5 is a section along line 5—5 in Figure 2.

Figure 6:
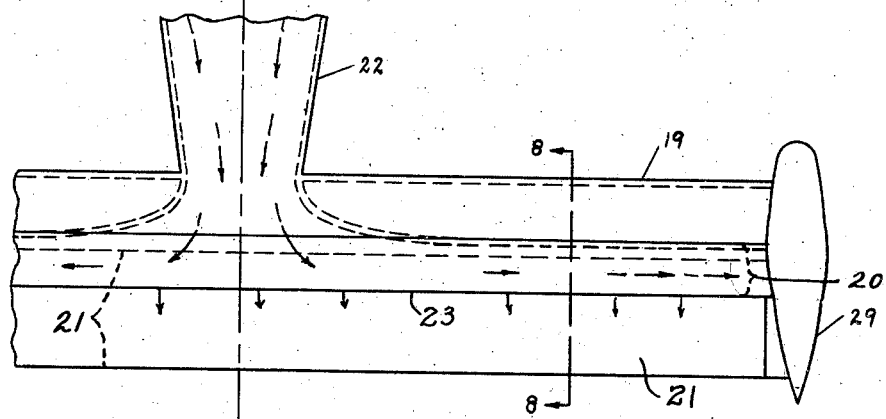
Figure 6 is a fragmentary plan view of a tail plane.
Figure 7:
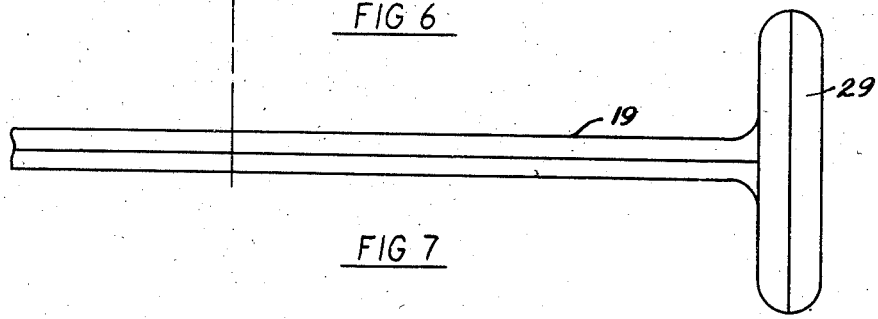
Figure 7 is a fragmentary elevation of the planes in Figure 6.
Figure 8:
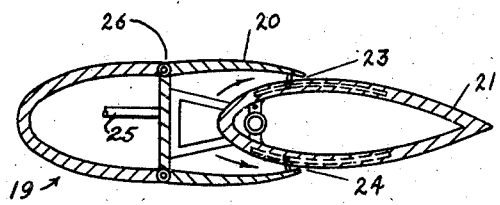
Figure 8 is a section along the line 8—8 in Figure 6.
Figure 10:
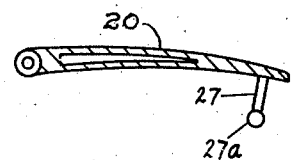
Figure 10 is a section through the surface flap to show the T-lug.

In banking an airplane for a turn the ordinary aileron produces a large yawing moment in opposition to the turn. This is undesirable since the rudder must be used to produce a large counter moment. It is desirable that the yawing moment from the ailerons be quite near zero or slightly favorable to the turn.

This invention describes a means of producing very powerful rolling moments by boundary layer control using small amounts of energy and accompanied by a yawing moment of any desired magnitude, even of zero value if desired.

The great rolling moment is obtained with an aileron having a unique upper curvature so that when it is depressed the upper surface of the wing as a whole has a smooth curvature of generous radius. Boundary layer control can then be effected on such a wing with very low energy expended in the jet which is blown outward along the surface.

The jet energizes the boundary layer and provides a thrust from the mass reaction which counteracts the adverse yawing moment from the aileron.

Referring particularly to the drawings, the wing is 1, the fuselage is 2 and the tail group is 3.

The wing has the aileron 4 near the tip. It has a normal upper surface contour so as to produce a reversal of curvature in the chordwise section of the wing, but when the aileron is depressed the wing upper contour is changed to a curvature free of reversals and of large radius. See dotted portion of aileron in Figure 5. With such a curvature the energy required for energizing the boundary layer is small. If the radius of curvature is small the power necessary to compel the flow to follow the flap is huge—too large for practical purposes.

Hence one of the main features of this invention embraces the discovery that a large radius is necessary at the flap juncture with the main portion of the wing.

The contour of the wing also can be described in terms of the depression of the concavity below a chordwise tangent to the opposite sides of the concavity or in terms of the radius of curvature of the extradoses. The average radius of curvature of a flap extrados should be less than that of the rear portion of the fore or main wing body so as to produce the concavity and so as to produce a smooth curvature when the flap is depressed. By average radius of curvature is meant the average radius of a group of small segments of the extrados.

The aileron is carried on the flap 5 which has the induction slot 8 leading into the wing interior in communication with the blower 9. It discharges its air through the slots 10 and 11. The former is in the flap 5 and the latter is formed between the flap and the upper wall of the aileron to facilitate rotation of the aileron and to control the slot flow with the minimum of mechanism.

The blower is driven from the engine by means of the propeller in the manner described in my U. S. Patent No. 1,913,644.

It is important that the lateral control moments available be at their maximum when the airplane is landing without power. For this reason I have provided a windmill to drive the blower 9. In this case the windmill is the propeller 9a on the engine 9b. The windmill is free to drive the blower relieved of the engine torque because of an automatic clutch between the propeller and the engine.

The blower communicates with the slots 10 and 11 through the passage 12.

Since the aileron 4 is carried on the flap 5 it is moved with 5 and is rotatable up and down relative to 5 for any position of 5. Flap 6 is also carried by flap 5 and is rotated coincidentally with 5 by a suitable mechanism not shown.

The aileron is moved by means of the mechanism shown in Figure 5. The sprocket 13 is actuated from the fuselage by a chain 13a. It turns the shaft 14 supported in the bearings 15 fixed to flap 5 and moving with it about the hinge 18. This shaft is connected to shaft 16 by the universal joint 17. The shaft 16 is threaded internally and accommodates the externally threaded shaft 16a articulated to the aileron at 16b. A rotation of 16 moves 16a axially and so rotates the aileron relative to the flap 5. Ailerons on opposite sides of the plane of symmetry of the airplane are operated differentially in the conventional manner. That is, one goes up while the other goes down. The pilot's stick is 13b and rotates the torque tube and sprocket 13c which carries the chain 13d connected to chain 13a.

At the time of landing the flaps 5 and 6 are depressed to give a high arching of the wing section, as shown dotted in Figure 5. The blower 9 is driven by the propeller acting as a windmill if the engine is not running.

Air is inducted through the slots 8 and 8a and discharged through the slots 10 and 11. It will be clear that when the aileron is fully depressed the slot 11 is wide open while when it is fully raised the slot 11 is closed. Hence when the aileron is producing an up-force, the jet is producing a forward thrust which will counteract the added drag arising from the lift engendered by the aileron. It is well known that an increase in lift is accompanied by an increase in induced drag.

When the aileron is up and the jet is eliminated there is produced a down-force on the wing without a forward thrust from the jet. Thus there is a turning or yawing moment from the jet on the side of the down aileron and hence the yawing moment is favorable to the turn accompanying the banking of the airplane. This is the desired situation.

It will now be understood that I have disclosed a control surface of such form as to make practical the use of boundary layer control in producing a powerful rolling moment. The scalloped wing section is essential to this so as to provide a large radius of curvature upon which to control the boundary layer. This radius of curvature has a critical value below which the power required for boundary layer control becomes exorbitant. The radius of curvature should be greater than the thickness of the wing near the juncture of the flap and main portion of the wing.

Furthermore, I have shown how to control jets at the wing tips simply so as to produce a favorable yawing moment to accompany the roll from the ailerons. To do this effectively the discharge slots should be in the rear one-half of the wing and preferably in the flaps themselves. Any induction slots should lie ahead of the discharge slots since if the jet is sucked into the wing it does not furnish a thrust.

In order to exert a thrust to produce a favorable yawing moment the jet must be produced by power and so a power driven blower is employed in the aircraft.

Figures 6 to 11 exhibit the application to tail planes. The horizontal tail is 19 of which parts are the flaps 20 and elevator 21. The tail is hollow and is supplied from the fuselage 22 with air or other gases, as shown particularly in Figure 6. The air flows out the slots 23 and 24 to some extent at all times.

Figure 9:
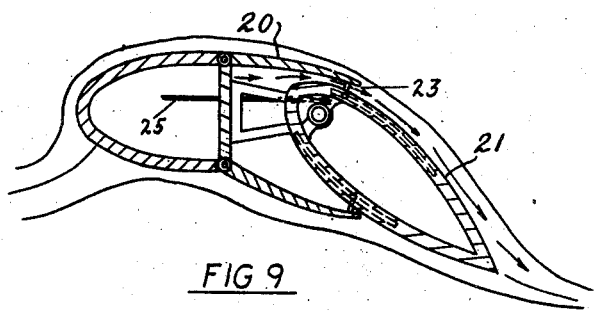
Figure 9 is the same section as Figure 8 with the flaps displaced.
Figure 11:
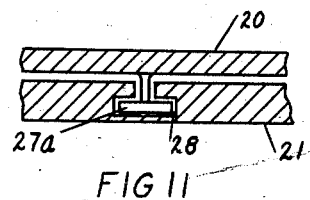
Figure 11 is a spanwise section through the upper surfaces of flaps 20 and 21 to show the T-lug in the T-slot.

When control is to be experienced the elevator 21 is rotated by means of the control rod 25, Figure 9. The flap 20 is also rotated and together with the elevator provides a smooth curved contour on one side of the tail plane. Also, the relation of the flap to the elevator changes so as to open up the slot on the convex side. The jet issuing controls the boundary layer so that a large control force is provided on the tail plane.

The flap 20 is hinged to the main part of the wing at 26 and connected to the elevator at its trailing edge by the lug 27 formed at one end into a cylinder 27a which slides in a T-slot 28 formed in the wall of the elevator 21. The T-slot has a varying depth so as to vary the slots 23 and 24 between the two parts. Thus in the position shown in Figure 8 the slots are small while in the position of Figure 9 the slot is large.

The fin and rudder may be constructed in similar manner.

For claim purposes I refer to flaps such as 20, which are bathed on one side only by the main relative wind stream, as surface flaps.

While I have illustrated certain specific forms of the invention it is to be understood that I do not limit myself to these exactly but intend to claim my invention broadly as indicated by the claims.

I claim:

1. In combination in an aircraft, a wing on each side of the aircraft having a flap and slot, ailerons at the outer ends of the wings, each said slot leading into the wing interior and being located in the rear half of the wing, and a blower within the aircraft in communication with the wing interior to discharge outward power jets through said slots, said discharge slot being the rearmost slot in said wing and being formed to direct the slot flow rearward substantially along the wing surface, control means operable coincidentally to vary the slot flows differentially and to rotate the flaps differentially both with respect to opposite wings, said control means being adapted to provide the strongest discharge slot jet on the wing with the down aileron, said power jets serving to produce a rolling moment accompanied by a favorable yawing moment.

2. In combination in an aircraft, a hollow wing having an induction slot and a discharge slot in the same side surface of the wing in communication with the wing interior and a movable trailing edge flap, a power driven blower within the aircraft in communication with said interior to induce an inflow through the induction slot and an outflow jet through the discharge slot, said discharge slot being formed to direct the slot rearward flow more along than normal to the wing surface, steering means to move the opposite flaps differentially and to control the discharge slot flows in opposite wings differentially with the force of the jet on the down-flap wing being increased relative to that on the up-flap wing, said discharge slots being aft of the induction slots in each wing and being the rearmost slots in the wings, the jet from the discharge slot on the down flap wing serving to provide a thrust to counteract the drag from the flap when down.

3. In combination in an aircraft, a hollow wing main body and a flap supported means for supporting said main body and flap in variable relation to form a wing on opposite sides of the aircraft, each said wing having a discharge slot in its upper surface in communication with the wing interior, said flaps being rotatable about spanwise axes, a blower within the aircraft in communication with the wing interior to discharge a power jet through said slots, and steering means to differentially control the flaps and the slot flows both with respect to opposite wings with the force of the jet on the down-flap wing being increased relative to that on the up-flap wing to produce a rolling moment accompanied by a favorable yawing moment, said discharge slot being the rearmost slot in said wing and being substantially adjacent the flap so that the jet can be deflected effectively by the flap.

4. In combination in an aircraft, wing main bodies and rear flaps supported in variable relation to form a hollow wing on each side of the plane of symmetry having a discharge slot in its upper surface in communication with the wing interior, said rear flaps being rotatable about spanwise axes, a blower within the aircraft in communication with the wing interiors to discharge outward jet flows through said slots, said discharge slots being the rearmost slots in the wing and being formed to direct the jets rearward substantially along the wing surface, and means coincidentally to move the flaps and control the slot flows both differentially with respect to wings on opposite sides of said plane whereby to create a rolling moment and a favorable yawing moment, each said flap when in neutral having an upper external chordwise contour whose average radius of curvature is substantially less than the average radius of curvature of the upper aft portion of the chordwise contour of the said main body immediately ahead of its rear end but greater than the thickness of said aft portion forming an upwardly arched external airfoil surface.

5. In combination in an aircraft, a hollow wing on each side of the plane of symmetry having a discharge slot in its upper surface in communication with the wing interior and a flap movable about a spanwise axis, a blower within the aircraft in communication with the wing interior to discharge jet flows through the slots, said discharge slots being formed to direct the slot flow rearward more along than normal to the surface, and means to create a rolling moment and a favorable yawing moment comprising means to control said slot flows differentially with respect to opposite wings with the force of the jet on the down-flap wing being increased relative to that on the up-flap wing, and means operable coincidentally with said control means to move the flaps differentially with respect to opposite wings, said discharge slots being the rearmost slots in the wing and being in the rear one-half of the wings so that the slot jets can be effectively deflected by the flaps.

6. In combination in an aircraft, a hollow wing on each side of the plane of symmetry having a rearward directed discharge slot in the upper rear half of its surface in communication with the wing interior and a flap movable about a spanwise axis, said slot extending spanwise in the direction of the flap axis, and a blower within the aircraft in communication with the wing interior to discharge outward jet flows through said slots, said discharge slots being the rearmost slots in the wing, and means to create a rolling moment and a favorable yawing moment by coincidentally moving the flaps differentially and controlling the slot widths differentially so that the slot of the wing with the lower flap has the greater flow and the greater resulting forward reaction, each said discharge slot being succeeded at a vertical spanwise section by a curved surface of the wing whose minimum radius of curvature is substantially greater than the thickness of the flap at this same section.

7. In an aircraft a stabilizing wing composed of a wing main body and a plurality of movable surface elements, means for adjustably securing said elements in tandem at the trailing edge of said wing, and means to move one of said elements to alter the camber of the wing section and provide a chordwise convex surface, one side of the wing having a radius of curvature at the juncture of two said elements substantially greater than the thickness of the wing at the said juncture, said wing having a slot in its surface on the convex side formed to discharge over said convex surface of the rearmost of said elements toward the trailing edge, a blower within the aircraft in communication with said slot to discharge an outward jet flow therethrough, to develop a forward thrust, said discharge slot being the rearmost slot in said wing, said jet and surface of large radius of curvature serving to facilitate the production of great lift for a minimum of power expenditure by the blower.

8. In combination, a wing main body and a trailing edge flap body, means for supporting said bodies in variable relation to form a wing, leaving a discharge slot communicating with the wing interior and discharging a jet of air above and below said trailing edge flap body, a surface flap hingedly supported about a spanwise axis on said main body and slideably supported on said trailing edge flap body to form part of the said wing and to complete the airfoil contour thereof, means to depress said trailing edge flap body, one said trailing edge flap body having a chordwise slot therein to accommodate a sliding lug, and the surface flap having a lug adapted to slide chordwise in said slot to govern the rotation of the surface flap about its said hinge axis in response to the change in position of said trailing edge flap, and blower means to discharge a jet through said discharge slots.

9. In combination, a wing main body and a trailing edge flap body, means for supporting said bodies in variable relation to form a wing, a surface flap hingedly supported about a spanwise axis on one of said bodies and slideably supported on the other to form part of the said wing and to complete the airfoil contour thereof, means to depress said trailing edge flap body, one of said bodies having a chordwise slot therein to accommodate a sliding lug, and the surface flap having a lug adapted to slide chordwise in said slot to govern the rotation of the surface flap about its said hinge axis, said chordwise slot having a variable depth below the surface of said body to provide a variable gap between the said body and surface flap for different positions of said flap body, and blower means to discharge a flow of air through said gap.

10. In combination in an aircraft, a wing main body and a trailing edge flap body, means for supporting said bodies in variable relation to form a wing on each side of the vertical plane of symmetry of the aircraft, with their upper surfaces overlapping, the upper chordwise contours of the main body and flap being convex and forming at their juncture a concavity having a substantial depth below a chordwise line tangent to the upper contour of the wing on opposite sides of said concavity, said wing having a slot in its upper rear half of the surface in communication with the wing interior, a blower within the aircraft in communication with the wing interior to discharge a flow through said slot, said discharge slot being the rearmost slot in the said upper surface, and means to rotate the opposite flaps differentially, in the neutral position of the flap the upper chordwise contour of said flap having a smaller average radius of curvature over the central half of its chord length than the average radius of curvature of said main body upper contour along its rear one-half of its chord length, said flap in the neutral position having its upper contour above a line through the trailing edge of the wing and tangent to the rear upper edge of said main body.

EDWARD A. STALKER.